United States Patent [19]
Billingsley

[11] Patent Number: 5,678,801
[45] Date of Patent: Oct. 21, 1997

[54] POST HOLE DIGGER STAND

[76] Inventor: William E. Billingsley, 936 County Rd. 719, Orrville, Ala. 36767

[21] Appl. No.: 554,200

[22] Filed: Nov. 6, 1995

[51] Int. Cl.$^6$ ................................................ F16M 11/00
[52] U.S. Cl. .................... 248/676; 248/670; 248/176.1; 248/176.3
[58] Field of Search ............... 248/176.1, 176.3, 248/188.5, 670, 676

[56] References Cited

U.S. PATENT DOCUMENTS

| | | | |
|---|---|---|---|
| 849,290 | 4/1907 | Vanderbilt | 248/176.1 X |
| 2,815,566 | 12/1957 | Hille | 248/176.1 X |
| 2,903,258 | 9/1959 | Jovanovich | 248/176.1 X |
| 3,503,390 | 3/1970 | Peters | 248/188.5 X |
| 4,215,838 | 8/1980 | Gullota | 248/176.1 X |
| 4,392,627 | 7/1983 | Van Den Broek | 248/176.1 |
| 4,865,284 | 9/1989 | Gosis et al. | 248/176.3 |
| 4,932,628 | 6/1990 | Pacheco | 248/676 |
| 5,014,961 | 5/1991 | Ferguson | 248/670 |
| 5,308,037 | 5/1994 | Gonzalez | 248/670 |
| 5,505,425 | 4/1996 | Shelton | 248/670 |

*Primary Examiner*—Alvin C. Chin-Shue
*Assistant Examiner*—Richard M. Smith
*Attorney, Agent, or Firm*—Pitts & Brittian, P.C.

[57] ABSTRACT

A post hole digger stand for supporting a post hole digger in a manner such that one person can secure a post hole digger to or remove a post hole digger from an appropriately equipped tractor like vehicle. The post hole digger stand includes a base which includes a main rail, a front cross rail and a rear cross rail and two support arms extending upward from the front cross rail. The support arms carry receiving assemblies for supporting the arms of main shaft support of the post hole digger. The support arms are adjustable in length. A driveline pin carried by the first end of the main rail receives the driveline of the post hole digger.

8 Claims, 3 Drawing Sheets

POST HOLE DIGGER STAND

TECHNICAL FIELD

This invention relates to the field of article supports and more specifically to the field of stands designed to support a post hole digger or equipment of the like.

BACKGROUND ART

A number of equipment used in the building, excavation and farming industries is secured to, supported by and operated with a tractor type vehicle. The equipment tends to be extremely heavy and requires several people to support the equipment while it is being secured to a vehicle. Specifically, post hole diggers are mounted to the rear of a tractor and operated via the tractor. Typically, a post hole digger requires at least three individuals to secure it to a tractor. At least two to support the device and one to make the required connections. Once connected, one individual operates the tractor and controls the post hole digger.

A variety of stands have been developed to support objects, equipment, etc. for storage, for positioning to ease securement to a vehicle or to provide access. Typical of the art are those devices disclosed in the following U.S. Patents:

| U.S. Pat. No. | Inventor(s) | Issue Date |
| --- | --- | --- |
| 4,932,628 | O. D. Pacheco | June 12, 1990 |
| 5,014,961 | W. H. Ferguson | May 14, 1991 |
| 5,308,037 | I. Gonzalez | May 3, 1994 |

The '628 patent teaches a portable engine test stand which incorporates engine test monitoring devices to support and monitor the performance of a running engine. The test stand is not configured to facilitate the insertion of an engine into a vehicle.

The '961 patent teaches a snow plow stand which provides storage for a vehicle attachable snow plow assembly. When placing the plow assembly into the stand or removing the plow assembly from the stand, the plow blade must be raised to clear the support for the plow assembly arms. The stand is not configured to support a post hole digger.

The '037 patent teaches an adjustable air handler base for air conditioning systems to support them at a spaced apart relationship from the floor to permit air in. The stand is not configured to support a post hole digger.

Therefore, it is an object of this invention to provide post hole digger stand which is configured to support post hole digger in a manner such that one person can secure the post hole digger to and remove the post hole digger from a tractor or like vehicle.

It is another object of the present invention to provide a post hole digger stand which provides a frame for storing a post hole digger when not is use.

SUMMARY

Other objects and advantages will be accomplished by the present invention which provides a post hole digger stand for supporting a post hole digger such that one individual can secure a post hole digger to or remove a post hole digger from a tractor. The post hole digger stand of the present invention includes a base from which at least one support arm extends. A second end of the support arm carries a receiver for supporting a portion of the post hole digger.

BRIEF DESCRIPTION OF THE DRAWINGS

The above mentioned features of the invention will become more clearly understood from the following detailed description of the invention read together with the drawings in which.

DESCRIPTION OF PREFERRED EMBODIMENTS

A post hole digger stand incorporating various features of the present invention is illustrated generally at 10 in the figures. The post hole digger stand 10 is designed to support a post hole digger in a manner such that one person can secure the post hole digger to and remove it from a tractor or like vehicle.

Figure 1:
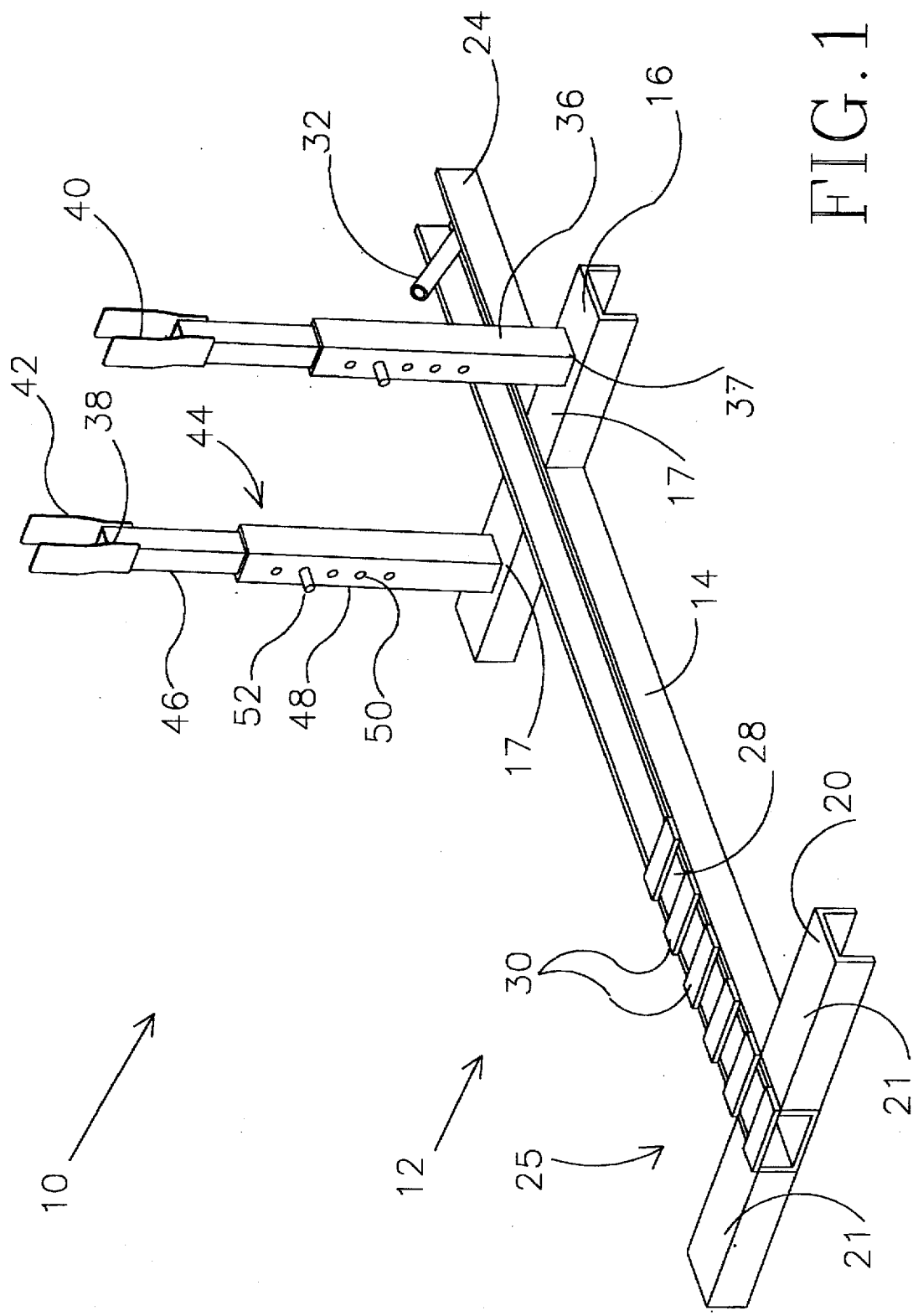
FIG. 1 is a perspective view of the post hole digger stand constructed in accordance with several features of the present invention.

The post hole digger stand 10 is generally comprised of a base 12 and two support arms 36 extending from the base 12. In the preferred embodiment, the base 12 includes a main rail 14, a front cross rail 16 and a rear cross rail 20, as shown in FIG. 1. Both the front cross rail 16 and the rear cross rail 20 extend perpendicularly across the main rail 14. In the embodiment depicted in the Figures, the front cross rail 16 is positioned at approximately ⅓ the length of the main rail 14, closer to the first end 24 of the main rail 14. It will be noted that the position of the front cross rail 16 is dictated by the dimensions of the post hole digger 56 to be supported by the post hole digger stand 10. The rear cross rail 20 is positioned at the second end 25 of the main rail 14. In the preferred embodiment, the front cross rail 16 includes two legs 17, each one secured to the main rail 14 and extending in opposing directions. The rear cross rail 20 is similarly configured, including two legs 21 extending in opposing directions. Preferably, the legs 17, 21 are secured to the main rail 14 by welding them to the main rail 14. In an alternate embodiment (not shown), a single piece rear cross rail is secured to the second end of the main rail.

An example of the dimensions of rails is as follows: the main rail 14 is 72" in length and 3" in width, and the legs 17, 21 of the front and rear cross rails 16, 20 are 18" in length and 3" in width. Of course, the dimensions of the main rail 14, front cross rail 16 and rear cross rail 20 depend upon the size and dimensions of the post hole digger 56 to be supported on the stand 10.

In the preferred embodiment, the main rail 14 defines a channel 28 at the second end 25 thereof. A plurality of cross bars 30 are secured across the channel 28 in a spaced manner. Further, in the preferred embodiment, a driveline pin 32 is secured to the first end 24 of the main rail 14 and extends up in a direction toward the second end 25 of the main rail 14 at a 45° angle from the main rail 14. In the embodiment depicted in the Figures, the entire length of the main rail 14 defines a channel 28 and the driveline pin 32 is secured to the bottom wall 29 of the channel 28.

The support arms 36 are secured to front cross rail 16 one to each side of the main rail 14. As shown in FIG. 1, a first end 37 of each of the support arms 36 is secured to a respective leg 17 of the front cross rail 16. A second end 38 of each of the support arms 36 carries a receiver 40. In the preferred embodiment, each receiver 40 includes two curved plates 42 each secured to opposing sides of the second end 38 of the respective support arm 36, as shown in FIG. 1. The positioning of the support arms 36 along the respective legs 17 is determined by the dimensions of the post hole digger to be supported by the stand 10.

In the preferred embodiment, each support arm 36 defines a length adjustor 44 such that the height of the respective receiver 40 can be adjusted with respect to the base 12. Preferably, each of the support arm 36 includes an upper tube 46 and a lower tube 48, one being receivable within the other. In the Figures, the upper tube 46 is receivable within the lower tube 48. The lower tube 48 defines a plurality of spaced openings 50 which extend through opposing sides of the lower tube 48. The upper tube 46 defines an opening 47 extending through opposing sides of the upper tube 46. The opening 47 of the upper tube 46 is matable with any of the openings 50 of the lower tube 48 such that a pin 52 is receivable through all four openings 47, 50. It will be noted that in an alternate embodiment (not shown), the lower tube is receivable within the upper tube, the lower tube defines one opening which is matable with each of a plurality of openings defined by the upper tube. It will be noted that any means for adjusting length of the support arms 36 to adjust the height of the receiver 40 would be suitable.

Figure 2:
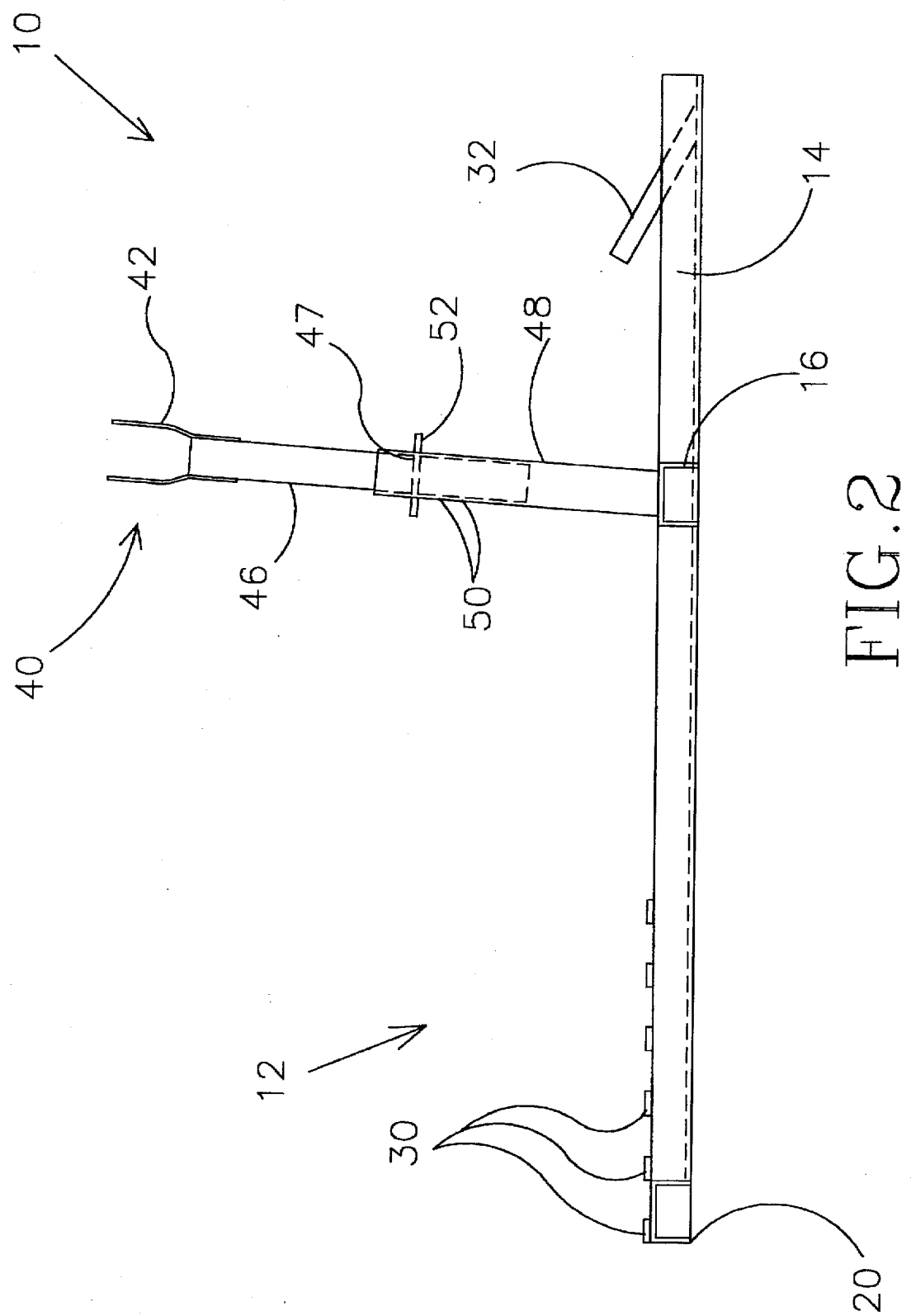
FIG. 2 is a side view the post hole digger of FIG. 1.

In the preferred embodiment, the support arms 36 extend at an angle less than 90° from the horizontal and leaning toward the first end 24 of the main rail 14, as shown in FIG. 2. Most preferably, the angle is approximately 80°.

Figure 3:
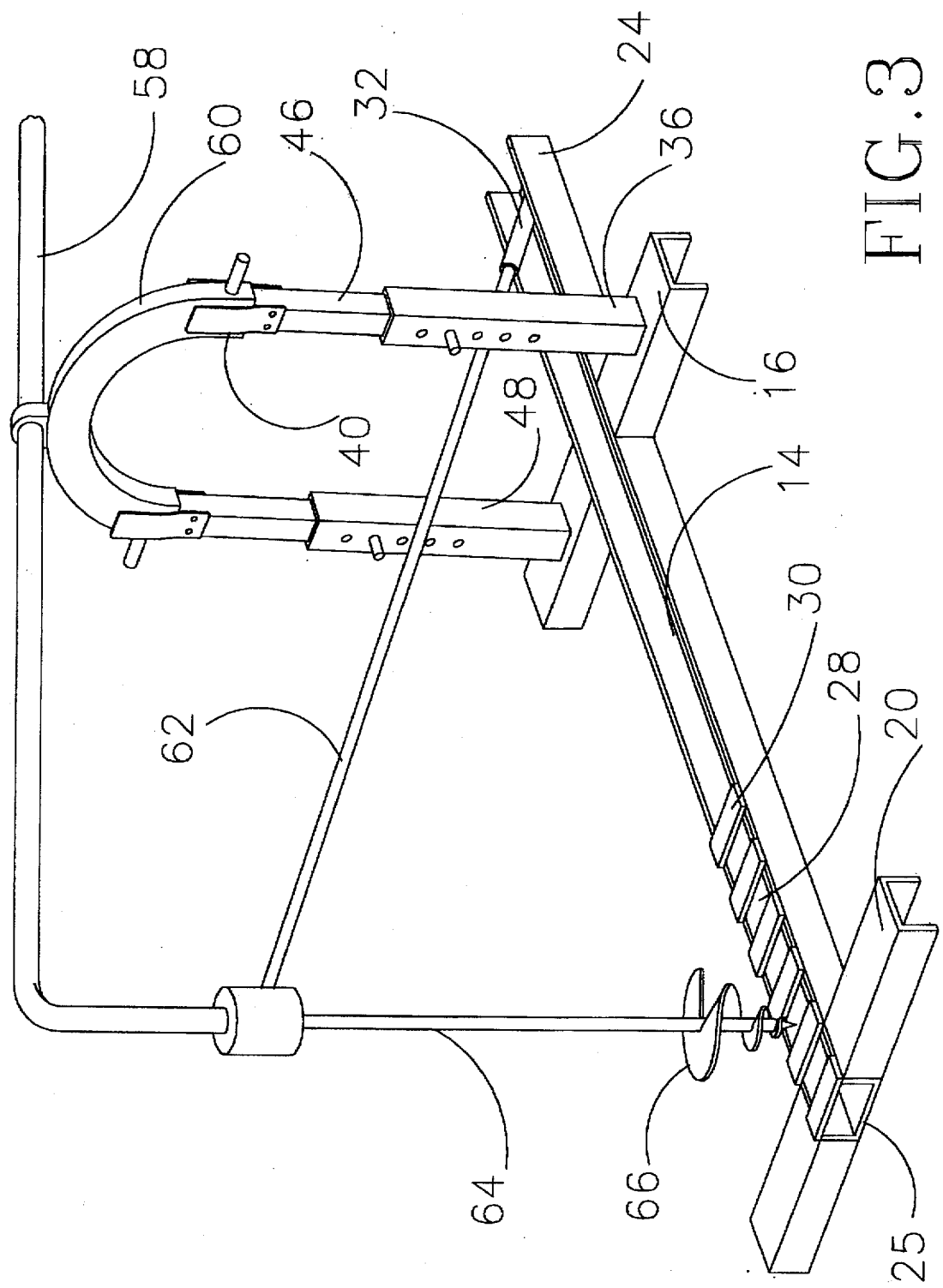
FIG. 3 illustrates the post hole digger stand of FIG. 1 supporting a post hole digger.

FIG. 3 illustrates a conventional post hole digger 10 which is supported by the post hole digger stand 10. The post host digger 10 is generally comprised of a main shaft 58, a main shaft support 60, a drive shaft 64 which carries a screw head 66 and a driveline 62 which drives the drive shaft 64. The main shaft 58 carries the drive shaft 64 and driveline 62 and is supported by the main shaft support 60. The main shaft support 60 includes two arms 61 extending from either side of the main shaft 58.

The post hole digger stand 10 is configured to stably support the post hole digger 56. Specifically, the two arms 61 of the main shaft support 60 are supported in the respective receiver 40 carried by each of the support arms 36, the driveline 62 is receivable on the driveline pin 32 and the end of the screw head 66 is receivable within the channel 28 of the main rail 14 between two of the plurality of cross bars 30. As stated previously, the dimensions of the stand 10 are dictated by the dimensions of the post hole digger 56 to be supported. Specifically, the position of front cross rail 16 with respect to the first end 24 of the main rail 14 is dictated by the horizontal distance between the arms 61 of the main shaft support 60 and the end of the driveline 62.

The post hole digger 56 is removed from the post hole digger stand 10 by securing the main shaft 58, the driveline 62 and the arms 61 of the main shaft support 60 to the rear end of an appropriately equipped tractor or like vehicle (not shown). Once secured to the tractor, the post hole digger 56 is lifted to remove the arms 61 of the main shaft support 60 from the receiving assemblies 40 and to remove the tip of the screw head 66 from the channel 28. The support arms 36 are set at an angle to ease the removal of the arms 61 of the main shaft support 60 from the receiving assemblies 40. To place the post hole digger 56 into the stand 10, the post hole digger 10 is lowered into the stand 10, all connections to the tractor are disconnected, and the driveline 62 is secured to the driveline pin 32. Again, the angle of the support arms 36 eases the replacement of the arms 61 of the main shaft support 60 of the digger 56 into the receiving assemblies 40. The stand 10 is constructed to be lightweight such that one person can move the stand 10 to a selected location before placing the post hole digger 56 on the stand 10.

From the foregoing description, it will be recognized by those skilled in the art that a post hole digger stand offering advantages over the prior art has been provided. Specifically, the post hole digger stand is configured to support post hole digger in a manner such that one person can secure the post hole digger to and remove the post hole digger from a tractor or like vehicle.

While a preferred embodiment has been shown and described, it will be understood that it is not intended to limit the disclosure, but rather it is intended to cover all modifications and alternate methods falling within the spirit and the scope of the invention as defined in the appended claims. For example, in an alternate embodiment (not shown), the stand includes a base from which a single support arm extends, the support arm carries a receiver for supporting both arms of main shaft support.

Having thus described the aforementioned invention, I claim:

1. A post hole digger stand for supporting a post hole digger which includes a main shaft, a main shaft support, a driveline, a drive shaft driven by the driveline and a screw head carried by the drive shaft, said post hole digger stand comprising:

a base defining a main rail, a front cross rail, and a rear cross rail, said front cross rail and said rear cross rail extending perpendicularly across said main rail, said front rail being positioned a selected distance from a first end of said main rail, said selected distance being the horizontal distance between the main shaft support and the distal end of the driveline of the post hole digger, said rear cross rail being positioned at a second end of said main rail, said main rail defining a channel at said second end, a plurality of cross bars being secured across said channel in a spaced manner, the end of the screw head being receivable in said channel between two of said plurality of cross bars; and, at least one support arm defining a first end and a second end, said first end being secured to said base, said at least one support arm extending upward from said base, said second end carrying a receiver for supporting the main shaft support.

2. The post hole digger stand of claim 1 further including a second support arm defining a first end and a second end, said first end of said at least one support arm being secured to said front cross rail on one side of said main rail, said first end of said second support arm being secured to said front cross rail on an opposing side of said main rail, said second end of said second support arm carrying a second receiver, said receiver carried by said at least one support arm and said second receiver cooperating to support the main shaft support.

3. The post hole digger stand of claim 1 wherein said at least one support arm defines a length adjustor for adjusting the length of said at least one support arm thereby adjusting the height of said receiver.

4. The post hole digger stand of claim 1 wherein said at least one support arm defines an upper tube and a lower tube, said upper tube being configured to be received within the lower tube, said lower tube defining a plurality of spaced openings extending through opposing sides of said lower tube, said upper tube defining one opening extending through opposing sides of said upper tube, said one opening being matable with any of said plurality of spaced openings such that a pin is receivable therethrough for adjusting the length of said at least one support arm.

5. A post hole digger stand for supporting a post hole digger which includes a main shaft, a main shaft support, a driveline, and a drive shaft with a screw head driven by the driveline, said post hole digger stand comprising:

a base defining a main rail, a front cross rail, and a rear cross rail, said front cross rail and said rear cross rail extending perpendicularly across said main rail, said front rail being positioned a selected distance from a first end of said main rail, said selected distance being the horizontal distance between the main shaft support and the distal end of the driveline of the post hole digger, said rear cross rail being positioned at a second end of said main rail;

a first and second support arm each defining a first end and a second end, said first end of said first support arm being secured to said front cross rail on one side of said main rail, said first end of said second support arm being secured to said front cross rail on an opposing side of said main rail, each of said second ends of said first and second support arm carrying a receiver for supporting the main shaft support, said main rail carrying a driveline pin positioned between said first end of said main fall and said front cross rail, said driveline pin being configured to receive the distal end of the driveline.

6. The post hole digger stand of claim 5 wherein said main rail defines a channel at said second end, a plurality of cross bars being secured across said channel in a spaced manner, the end of the screw head being receivable in said channel between two of said plurality of cross bars.

7. The post hole digger stand of claim 5 wherein each of said first and second support arms defines a length adjustor for adjusting the height of each of said receivers.

8. The post hole digger stand of claim 5 wherein each of said first and second support arms defines an upper tube and a lower tube, said upper tube being configured to be received within the lower tube, said lower tube defining a plurality of spaced openings extending through opposing sides of said lower tube, said upper tube defining one opening extending through opposing sides of said upper tube, said one opening being matable with any of said plurality of spaced openings such that a pin is receivable therethrough.

* * * * *